Jan. 2, 1968  D. C. STAHLY  3,361,917
PERMANENT MAGNET MOTOR
Filed June 21, 1965  3 Sheets-Sheet 2
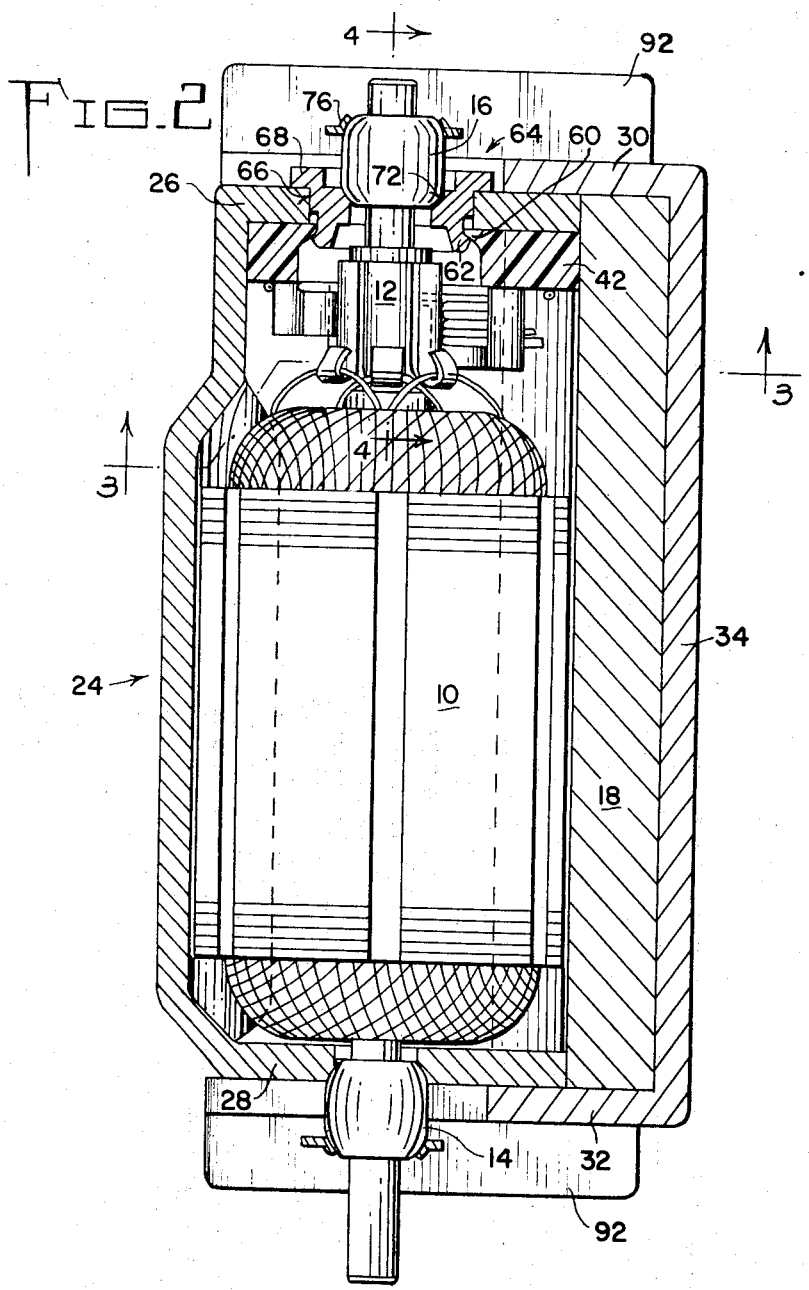
Inventor
Daniel C Stahly
By
George R. Clark
Att'y

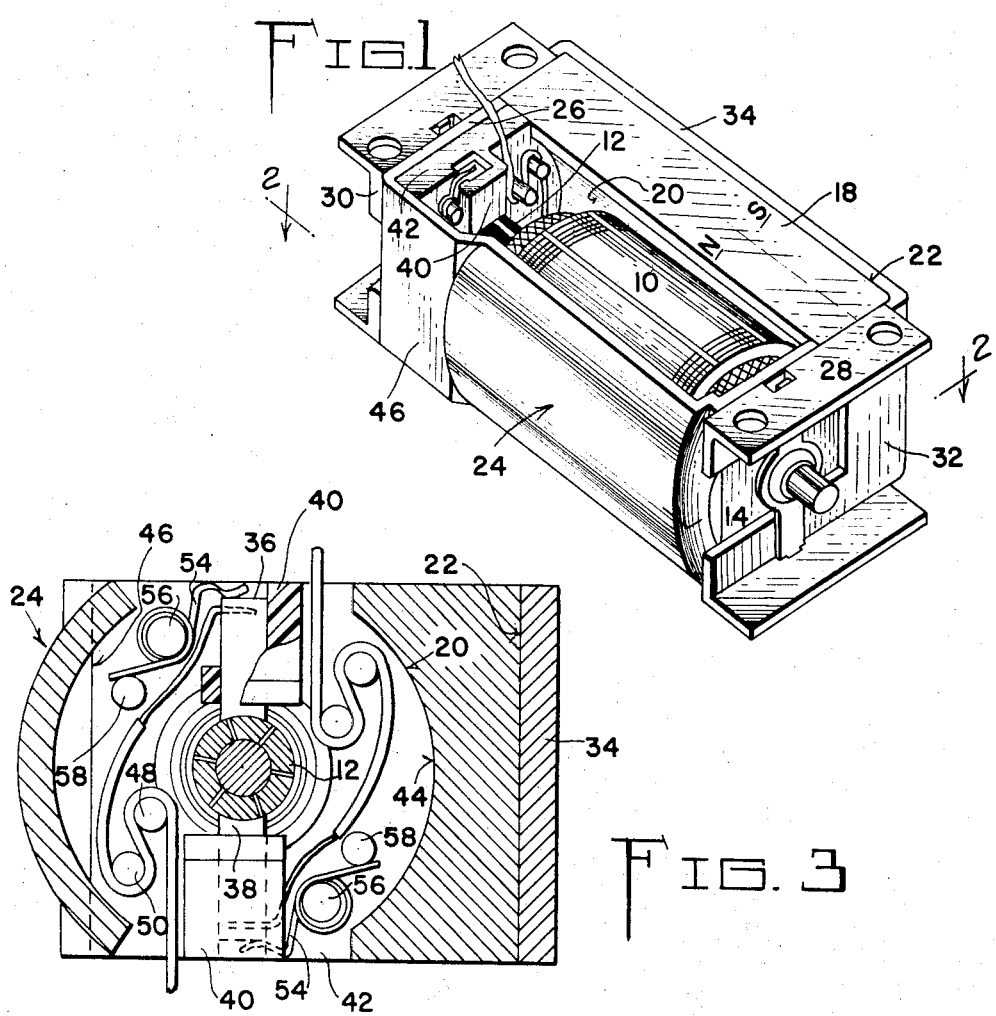

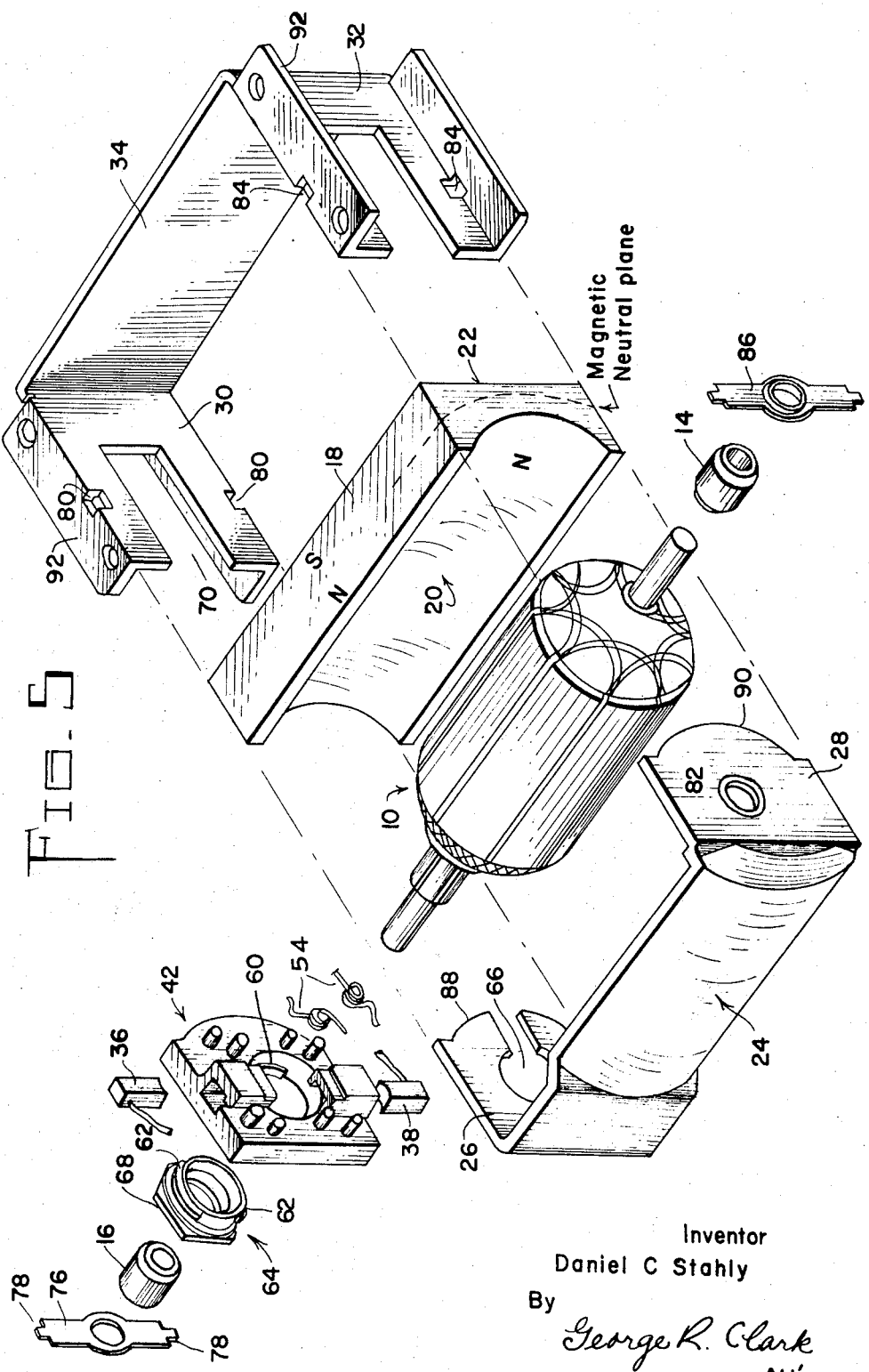

United States Patent Office 3,361,917
Patented Jan. 2, 1968

3,361,917
PERMANENT MAGNET MOTOR
Daniel C. Stahly, Villa Park, Ill., assignor to Sunbeam Corporation, Chicago, Ill., a corporation of Illinois
Filed June 21, 1965, Ser. No. 465,429
10 Claims. (Cl. 310—154)

ABSTRACT OF THE DISCLOSURE

A permanent magnet motor utilizes a single permanent magnet having one major face cylindrically curved to form one pole piece for the generally cylindrical armature, and is magnetized in the direction of its thickness dimension. Its opposite major face is flat and engaged by the bight portion of a first C-shaped yoke whose legs pass around the ends of the permanent magnet and interfit with the legs of a second C-shaped yoke, which legs provide armature-bearing locating formations. The free ends of these last-named legs are shaped and dimensioned to engage the curved pole face of the permanent magnet to establish the armature air gap for that pole, while the bight portion of this yoke is shaped and dimensioned to establish the opposite armature air gap. Centering of the armature and control of the air gap spacing is thus rendered independent of tolerances in the dimensions of the magnet and of the first yoke, and a minimum practicable air gap for good efficiency is achieved.

---

This invention pertains to electric motors of the permanent magnet field type, and especially to relatively small, low-power motors of the kind used in battery-operated appliances such as electric shavers or the like.

Modern permanent magnet materials and techniques have opened up large fields of use for small motors, especially of the DC or battery-powered types. These modern magnets not only provide improved magnetic efficiency, largely due to their stronger fields, but they also permit mechanical designs which are vastly different from those employed with wound-field motors, or even with purely ferrous permanent magnets. These mechanical features, in turn, may yield improved electrical characteristics quite apart from the greater field strength of the magnets. For example, the shapes and forms of the permanent magnets can be specified very precisely, as they are usually manufactured by molding or sintering techniques that are compatible with close tolerances while permitting almost any conceivable shape to be imparted to the magnet.

Notwithstanding the improved capabilities or potentialities of these permanent magnets (e.g., of the ceramic type), motor designs intended to incorporate them have usually followed rather slavishly the arrangements earlier used with field magnets of the wire-wound type, or of relatively low-strength permanent magnets of iron, iron alloys, or the like. The design freedom inherent in the use of modern high-strength ceramic and the like magnet materials has thus not been fully utilized by the art.

It is accordingly a principal object of the present invention to provide a permanent magnet motor which takes full advantage of the great field strength of available magnetic materials, in that a single permanent magnet of particular shape and magnetic design provides adequate field flux and motor power with a minimum size and weight of the motor, and at strictly minimal cost of production.

A more specific object of the invention is to provide a motor of the above type in which the single permanent magnet, though unsymmetrically placed relative to the rotating armature, provides an optimal value of field flux of proper distribution for coaction with the rotor.

Still another object of the invention is to provide a single-magnet permanent magnet motor of the type described, in which the assembly and precise positioning of the interfitting parts of the motor inherently attain the desired small and closely regulated rotor air gap, as well as the proper location of the brush rigging and other parts of the assembly; all without the necessity for accurately located holes, threaded assembly fasteners, or the like.

Yet another object of the invention is to provide a motor design of the above type in which the single permanent magnet itself, formed to close tolerances of size and shape, constitutes the means by which proper mechanical assembly of the motor is assured.

Still a further object of the invention is to provide an extremely simple design of this type in which the permanent magnet is substantially or effectively surrounded by field-flux conducting iron yoke elements, which also form the mechanical framework for the motor, leading to a very efficient utilization of the materials employed, and consequent high power-to-volume ratio for the motor.

In brief, the above and other objects and advantages of the invention are achieved by an arrangement in which the generally conventional cylidrical wound rotor of a DC motor rotates closely adjacent (and in effect within) a cylindrically-curved major face of the single permanent magnet, which is magnetized in the direction radial to, or at least transverse to, the cylindrical rotor, so that one of its poles occupies that cylindrically-curved face, and the other occupies a major flat face opposite thereto. A field structure comprising interfitting generally C-shaped yokes, of iron or like magnetically permeable material, of which a first yoke includes one flat face positioned in direct contact with the flat pole face of the permanent magnet, and thus serves to conduct the flux into the legs of both yoke structures and ultimately to a cylindrically-curved face of the second yoke lying on the other side of the rotor from the permanent magnet. The legs of this second yoke are shaped at their free ends with cylindrical curvature to fit precisely against the cylindrically-curved major face of the permanent magnet, and the length of these legs is such as to provide accurate spacing for reception of the rotor. The leg portions of the second yoke serve to position and mount the bearings for the shaft ends of the rotor, as well as the brush assembly that coacts with the commutator segments of the armature rotor.

With the above characteristics generally in mind, the invention will best be understood by considering now the following detailed specification of a preferred embodiment thereof, taken in connection with the appended drawings, in which:

FIG. 1 is a perspective view, typically somewhat larger than life size, of a completely assembled motor embodying the invention.

FIG. 2 is a horizontal sectional view, to a larger scale, taken generally in the plane indicated by the arrows 2—2 of FIG. 1.

FIG. 3 is a transverse sectional view taken along line 3—3 of FIG. 2.

FIG. 4 is a fragmentary sectional view taken along line 4—4 of FIG. 3.

FIG. 5 is an exploded perspective view of the components of the motor.

The construction and arrangement of the major components of the motor of the invention are best shown in FIGS. 1 and 2 of the drawings. These components include the generally conventional wound-rotor armature 10 with its commutator 12, and having its shaft ends received in self-aligning bearing bushings 14 and 16. The single permanent magnet is indicated at 18, the same having a cylindrically-curved face 20, facing the rotor, of one magnetic polarity (North polarity, say), and a major flat face 22 of the opposite (South) polarity. This relatively thin permanent magnet may thus be said to be magnetized in the direction of its least dimension; that is, in its thickness direction, and there is a magnetic neutral plane (FIG. 5) midway between the major faces 20 and 22.

In accordance with the conventions of magnetic flux analysis, it is apparent that flux lines emanating from the curved face 20 of the magnet pass directly, and in a generally radial direction, into and through the armature 10. The curved face of the magnet thus itself constitutes one of the two usual field poles of the motor. The opposite field pole is provided by the cylindrically curved face of the major portion of a C-shaped yoke 24 whose end legs 26 and 28 fit closely within, and are embraced by, the end legs 30 and 32 of another yoke member whose major flat central portion 34 fits closely in facial contact with the South pole face 22 of magnet 18. The two iron (and hence magnetically permeable) field yokes provide a flux path of adequately low reluctance through the rotor armature 10 without depending upon leakage flux through high reluctance air gaps (except that minimal radial gap at the surface of the armature required by its rotary motion).

It is apparent from the foregoing that yoke 24 is accurately located with reference to the cylindrical pole face 20 of the magnet regardless of any tolerance or inaccuracy in the thickness dimension of the magnet. As will appear below, the legs 26 and 28 of this yoke determine both the spacing of yoke 24 from the cylindrical magnet face and the centering of the axis of the rotor 10 within that space.

The brush rigging for the motor is clearly visible in FIGS. 1 and 2 and 3 of the drawings. Both brushes 36, 38 are conventional carbon brushes, preferably of square cross-section, and received slidably in square socket formations 40 formed integral with a plastic block 42 having one lateral edge 44 shaped (see FIG. 3) to conform to the curvature of the cylindrical pole face 20 of magnet 18, and its opposite lateral edge square to conform to a straight portion 46 of the yoke 24. When the yokes are interfitted completely, the brush block 42 is thus securely located and held in position. The flexible pig-tail leads from the respective brushes are snubbed about short upstanding plastic posts such as at 48, 50 of the brush block, and thence lead to the external battery supply circuit of the motor. The brushes are urged lightly against the segments of commutator 12 by respective springs 54 wound about other integral upstanding posts 56 on the brush block, and having their tails locked behind stop lugs or posts 58.

In order to hold the brush assembly firmly against motion in the direction of the axis of rotor 10, the construction best shown in FIGS. 2 and 5 is provided. The brush block 42, of course, has a central aperture through which passes one end of the rotor shaft. This aperture is preferably circular, but in any event is provided with spaced or interrupted arcuate bayonet-type formations 60 which can be engaged by mating hook formations 62 of a cup element 64 received in an aperture 66 in one leg 26 of the yoke 24. This cup element has an outer hexagonal rim formation 68, so arranged that when the cup has been inserted through aperture 66 and so rotated that its hook formations grip the arcuate locking formations of the brush block 42, the hex flats of the rim will slide into a slot 70 in one of the legs 30 of the other yoke member. When so assembled, the cup 64 cannot turn, and the brush block is held flat against the inner surface of yoke leg 26, in proper position for engagement of the brushes with the commutator segments.

Cup element 64 also provides, facing outwardly of the yoke assembly, a concial bearing surface 72 (FIG. 2) for self-aligning cooperation with the bevel-edge bushing 16 of bronze, for example, whose opposite end, also beveled, seats in a tapered hole in a leaf spring 76. The latter has at each end a projection 78 adapted to engage, when assembly is complete, in respective apertures 80 in yoke leg 30, the length of the leaf spring being such that it must be slightly bowed to permit insertion, and thus holds itself in place when the bowing is released.

The leg 28 of yoke 24 has a beveled circular aperture 82 through which passes the opposite end of the rotor shaft, and thence through the other bronze self-aligning bushing 14, in turn held in place by a leaf spring 86 whose end projections, as before, interfit with apertures 84 in the leg 32 of the other field yoke. The spacing of yoke legs 30 and 32 is such that they fit tightly against the legs 26 and 28 of the other yoke, but permit the sliding assembly motion of the one relative to the other, as indicated in FIG. 5, after the rotor has been assembled into yoke 24 with the brush block assembly.

In order to maintain the yoke 24 precisely in position relative to the other yoke and the permanent magnet 18, the distal end edges of legs 26 and 28 of yoke 24 are provided with curved surfaces 88, 90 precisely located and shaped so as to lie against the curved surface 20 of the permanent magnet. Thus, when the yokes have been interfitted tightly together, with the magnet's rear face 22 engaging the major face 34 of the bight portion of that yoke, the exact air gap spacing of the rotor or armature 10 within the field yoke structure will be established and maintained in a very dependable manner. Outwardly turned flanges such as at 92 on the legs 30 and 32 of the outer yoke member provide assembly spacing beyond the outer projections of the rotor shaft bearings (14, 16), and may contain holes, threaded or otherwise, for the ultimate mounting of the motor as a whole in a casing or in relation to other components of a complete apparatus.

It will be understood from the foregoing description that the generally cylindrical armature member of the motor is embraced between cylindrically curved faces of a field assembly, with a suitable radial air gap, and that one of these faces is a face 20 of the permanent magnet 18, while the diametrically opposite one is the inner face of the bight portion of yoke 24. Each of these faces corresponds to, and lies adjacent, the full length of the armature, but only along a portion of the peripheral surface of the armature's cylindrical outer wall. It is in this sense that certain of the claims refer to the field structure as conforming to "a portion" of the cylindrical armature wall. It will also be understood that the chamfered or beveled end faces of the bearing bushings 14 and 16 constitute them as the locating means responsible for the positioning of the armature centrally in the cylindrical space between magnet 18 and yoke 24, while the abutting of the ends 88, 90 of the latter against the magnet face 20 accurately define the diameter of that cylindrical space, and hence the total air gap and its equal distribution on opposite sides of the armature when the latter is centrally positioned. The chamfered inner edges of the bearing bushings positively locate the armature relatively to legs 26, 28 of yoke 24, while the chamfered outer edges thereof, and springs 76, 86, maintain the bushings in position relative to the legs of both yokes despite slight self-aligning movements thereof.

It is apparent also that the slot opening into aperture 66 of yoke leg 26 allows the armature and brush rigging to be dropped easily into that yoke (the opposite end of the armature shaft having first been passed into aperture 82 of leg 28), and then securely held in place by the application of cup 64 which, when twisted, holds itself and the brush block 42 securely to leg 26.

Since the efficiency of motors of this type is closely related to the success attained in keeping the magnetic air gap to a minimum, and since the accumulation of tolerances ordinarily dictates a substantial air gap of greater thickness than desirable, the present design achieves an important reduction in air gap simply because both the armature bearing openings and the field pole remote from the magnet are positioned directly with reference to the inner magnet face. The tolerances in magnet thickness and in the dimensions of yoke 34 are no longer a factor in air gap thickness, and the latter can therefore easily be held much closer to the optimum value.

The invention has been disclosed herein in connection with a presently preferred embodiment, but various modifications will occur to those skilled in the art, and it is not intended to exclude from the invention any such modifications except such as do not fall within the scope of the appended claims.

What is claimed is:

1. An electric motor comprising a wound cylindrical armature, a relatively thin, flat permanent field magnet having one major face cylindrically curved to conform to a portion of the cylindrical wall of said armature and a flat opposite major face, said magnet having a length greater than the wound body of said armature, and being magnetized generally parallel to its thickness dimension with opposite magnetic poles at said major faces; a first C-shaped yoke member of magnetically permeable material providing a bight portion curved to conform to a portion of the cylindrical wall of said armature, and leg portions traversing the ends of said armature; and a second C-shaped yoke member of magnetically permeable material providing a bight portion in contact with the said opposite major face of the permanent magnet, and leg portions overlapping the leg portions of said first yoke member.

2. An electric motor in accordance with claim 1, including respective bearing bushings on armature shaft portions extending from the ends of said armature, said bushings being seated at one end of each in apertures in the respective leg portions of one yoke member, a circularly apertured leaf spring seated on the other end of each bushing, and each leaf spring engaging locating formations of the respective leg portions of the other yoke member.

3. An electric motor in accordance with claim 1, including a brush rigging support block disposed against the inner face of one leg of said first yoke member.

4. An electric motor in accordance with claim 3, in which said support block is secured against said inner face of said one leg by a fastener extending through said leg and having bearing engagement against the outer face of said one leg.

5. An electric motor in accordance with claim 4, in which said support block and said fastener have cooperative rotationally-engageable bayonet locking formations.

6. An electric motor in accordance with claim 5, in which the leg portion of said second yoke member overlapping said one leg of said first yoke member is slotted to receive, and to restrain against rotation, a portion of said fastener which extends beyond the outer face of said one leg of said first yoke member.

7. An electric motor comprising a cylindrical armature, a relatively thin permanent field magnet having a first major face positioned alongside, and cylindrically curved to conform to, a portion of the cylindrical wall of said armature, and having a second major face opposite said first major face; said magnet having a length at least substantially as great as the body of said armature, and being magnetized generally parallel to its thickness dimension with opposite magnetic poles at said major faces; a yoke member of magnetically permeable material providing a bight portion curved to conform to the cylindrical wall of said armature, and leg portions traversing the ends of said armature, and magnetically permeable means magnetically coupling the second major face of said field magnet with the leg portions of said yoke member.

8. An electric motor in accordance with claim 7, in which the distal end edges of the leg portions of said yoke member are curved to conform to, and are engaged against, the curved major face of said field magnet.

9. An electric motor comprising a cylindrical armature, a permanent field magnet having one major face cylindrically curved to conform to a portion of the cylindrical wall of said armature, and being magnetized generally parallel to its thickness dimension, a yoke member of magnetically permeable material providing a bight portion curved to conform to a portion of the cylindrical wall of said armature, and leg portions traversing the ends of said armature; said leg portions having their free ends shaped so as to position said yoke accurately with respect to the curved face of said magnet; and means securing said yoke to said magnet with said ends abutted against said cylindrical face of the magnet.

10. An electric motor in accordance with claim 9, including bearing means for the ends of said armature secured to the legs of said yoke member.

References Cited

UNITED STATES PATENTS

| | | | |
|---|---|---|---|
| 2,325,915 | 8/1943 | Naul | 310—154 |
| 2,453,101 | 11/1948 | Schulz | 310—154 |
| 2,598,211 | 5/1952 | Beliaeff | 310—154 |

MILTON O. HIRSHFIELD, *Primary Examiner.*

L. L. SMITH, *Assistant Examiner.*